United States Patent
Diop et al.

(10) Patent No.: US 11,456,853 B2
(45) Date of Patent: Sep. 27, 2022

(54) PROTECTION OF AN ITERATIVE CALCULATION

(71) Applicant: STMICROELECTRONICS (ROUSSET) SAS, Rousset (FR)

(72) Inventors: Ibrahima Diop, Marseilles (FR); Yanis Linge, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 386 days.

(21) Appl. No.: 16/810,434

(22) Filed: Mar. 5, 2020

(65) Prior Publication Data

US 2020/0313846 A1 Oct. 1, 2020

(30) Foreign Application Priority Data

Mar. 29, 2019 (FR) ...................................... 1903353

(51) Int. Cl.
*H04L 9/00* (2022.01)
*G06F 7/72* (2006.01)
*G06F 7/504* (2006.01)
*G06F 7/525* (2006.01)

(52) U.S. Cl.
CPC .............. *H04L 9/002* (2013.01); *G06F 7/504* (2013.01); *G06F 7/525* (2013.01); *G06F 7/72* (2013.01)

(58) Field of Classification Search
CPC ........... H04L 9/002; G06F 7/722; G06F 7/723
See application file for complete search history.

(56) References Cited

U.S. PATENT DOCUMENTS

| 6,008,075 | A | 12/1999 | Lien et al. |
| 6,973,190 | B1 * | 12/2005 | Goubin ................... G06F 7/723 380/263 |
| 6,986,054 | B2 * | 1/2006 | Kaminaga ............. H04L 9/3013 380/279 |
| 8,139,763 | B2 | 3/2012 | Boscher et al. |
| 9,014,368 | B2 | 4/2015 | Teglia |
| 10,025,559 | B2 | 7/2018 | Diop et al. |
| 10,354,063 | B2 | 7/2019 | Diop et al. |
| 2005/0078821 | A1 | 4/2005 | Jin et al. |

(Continued)

FOREIGN PATENT DOCUMENTS

| EP | 1 134 653 A2 | 9/2001 |
| FR | 2 875 355 A1 | 3/2006 |

(Continued)

OTHER PUBLICATIONS

U.S. Appl. No. 16/435,309, filed Jun. 7, 2019, Protection of an Iterative Calculation.

(Continued)

*Primary Examiner* — Chuong D Ngo
(74) *Attorney, Agent, or Firm* — Seed Intellectual Property Law Group LLP (57) ABSTRACT

Cryptographic circuitry, in operation, performs a calculation on a first number and a second number. The performing of the calculation is protected by breaking the second number into a plurality of third numbers, a sum of values of the third numbers being equal to a value of the second number. The calculation is performed bit by bit for each rank of the third numbers. Functional circuitry, coupled to the cryptographic circuitry, uses a result of the calculation.

31 Claims, 4 Drawing Sheets

(56) References Cited

U.S. PATENT DOCUMENTS

| | | |
|---|---|---|
| 2008/0019509 A1 | 1/2008 | Al-Gahtani et al. |
| 2008/0044010 A1 | 2/2008 | Vasyltasov |
| 2008/0175385 A1 | 7/2008 | Lee et al. |
| 2009/0067617 A1 | 3/2009 | Trichina et al. |
| 2009/0092245 A1 | 4/2009 | Fumaroli et al. |
| 2009/0097637 A1 | 4/2009 | Boscher et al. |
| 2013/0016826 A1 | 1/2013 | Teglia |
| 2013/0016828 A1 | 1/2013 | Teglia |
| 2014/0281573 A1 | 9/2014 | Jaffe |
| 2015/0063561 A1 | 3/2015 | Teglia |
| 2017/0187529 A1 | 6/2017 | Guilley et al. |
| 2020/0287711 A1* | 9/2020 | Araki ............... G06F 7/72 |

FOREIGN PATENT DOCUMENTS

| | | |
|---|---|---|
| FR | 2 979 725 A1 | 3/2013 |
| GB | 2 399 904 A | 9/2004 |
| WO | 2006/103341 A1 | 10/2006 |
| WO | 2016/053792 A1 | 4/2016 |

OTHER PUBLICATIONS

U.S. Appl. No. 16/425,307, filed Jun. 7, 2019, Protection of an Iterative Calculation.

U.S. Appl. No. 16/041,077, filed Jul. 20, 2018, Protection of an Iterative Calculation Against Horizontal Attacks.

Choi et al., "An Improved Square-always Exponentiation Resistant to Side-channel Attacks on RSA Implementation," *Intelligent Automation & Soft Computing* 22(3):353-363, 2016.

Clavier et al., "Horizontal Correlation Analysis on Exponentiation," *Twelfth International Conference on Information and Communications Security*, Barcelona, Spain, Dec. 2010, 19 pages.

Feix et al., "Side-Channel Analysis on Blinded Regular Scalar Multiplications," *Proceedings of INDOCRYPT 2014*, Jan. 1, 2014, 25 pages.

Ha et al., "Power Analysis Attacks on the Right-to-Left Square-Always Exponentiation Algorithm," *Journal of Internet Services and Information Security* 4(4):38-51, 2014.

Itoh et al., "DPA Countermeasures by Improving the Window Method," *Lecture Noted in Computer Sciences* 2523:303-317, 2002.

Joye et al., "The Montgomery Powering Ladder," *Cryptographic Hardware and Embedded Systems International Workshop 2002*, Aug. 13, 2002, 12 pages.

Kim et al., "Safe-Error Attack on SPA-FA Resistant Exponentiations Using a HW Modular Multiplier," International Conference on Information Security and Cryptology, Seoul, South Korea, 2007, 9 pages.

Lesavourey et al., "Efficient Randomized Regular Modular Exponentiation using Combined Montgomery and Barrett Multiplications," *Thirteenth International Conference on Security and Cryptography*, Lisbon, Portugal, Jul. 2016, 9 pages.

\* cited by examiner

PROTECTION OF AN ITERATIVE CALCULATION

BACKGROUND

Technical Field

The present disclosure generally concerns electronic circuits and, more specifically, circuits executing iterative operations. The present disclosure more specifically relates to the protection of modular exponentiation calculations or of calculations on elliptic curves against attacks aiming at discovering quantities manipulated by such calculations.

Description of the Related Art

In many applications, electronic circuits implement cipher, authentication, signature calculation algorithms, and more generally algorithms manipulating data, called secret data, that is, the access to which is desired to be reserved to certain users or circuits. Among such algorithms, some use iterative operations. These may be modular exponentiations, for example, RSA-type algorithms, or products on elliptic curves, for example ECDH-type algorithms.

There exist many methods, called attacks, to attempt discovering or hacking secret data manipulated by such calculations. Among such attacks, so-called side channel attacks use indirect information such as the power consumption of the circuit (SPA, DPA attacks), the electromagnetic radiation thereof, etc. The interpretation of such information provides the hacker with information relative to the secret data.

Among side-channel attacks, one can in particular distinguish attacks called vertical and attacks called horizontal.

Horizontal attacks, more particularly targeted by the present disclosure, comprise comparing segments originating from a same trace (for example, power consumption or radiation) with one another, to extract the secret information. They use a single execution trace.

BRIEF SUMMARY

There is a need to improve the protection against side channel attacks, in particular against horizontal attacks, of data manipulated by algorithms having each of their executions implementing iterative steps.

An embodiment facilitates overcoming all or part of the disadvantages of usual methods and circuits of protection of data manipulated by algorithms against horizontal attacks.

An embodiment provides a method of protecting a calculation on a first number and a second number, executed by an electronic circuit, wherein:

the second number is broken down into a sum of at least two third numbers; and the calculation is performed bit by bit for each rank of the third numbers.

According to an embodiment, the calculation is a modular exponentiation of the first number by the second number.

According to an embodiment, the calculation is a multiplication of a point of an elliptic curve by a scalar.

According to an embodiment, the ranks of the bits of the third numbers are scanned by increasing order.

According to an embodiment, the bits of same rank of the third numbers are processed in a same order, from one rank to the other.

According to an embodiment, the bits of same rank of the third numbers are processed in a random order.

According to an embodiment, the processing order of the bits of same rank of the third numbers results from a permutation.

According to an embodiment, the processing performed on the bits of each rank comprises:

if the considered bit is equal to 1, performing a first operation with an operator on the contents of a first register and of a second register, and then placing the result in the first register; and if the considered bit is equal to 0, keeping unchanged the contents of the two registers.

According to an embodiment, the first register contains the result of the calculation.

According to an embodiment, said operator is multiplication.

According to an embodiment, said operator is addition.

According to an embodiment, the first register is initialized with the neutral element of said operator.

According to an embodiment, the second register is initialized with the first number.

According to an embodiment, after having processed all the bits of a same rank of the third numbers, a second operation is performed with said operator on the content of the second register, the result of the second operation being placed in the second register.

According to an embodiment, the operation(s) are performed modulo a fourth number.

An embodiment provides an electronic circuit configured to implement one or more of the described methods.

In an embodiment, a method comprises: executing, using an electronic circuit, a calculation on a first number and a second number; and protecting the executing of the calculating, the protecting including: breaking the second number into a plurality of third numbers, a sum of values of the third numbers being equal to a value of the second number; and performing the calculation bit by bit for each rank of the third numbers. In an embodiment, the calculation is a modular exponentiation of the first number by the second number. In an embodiment, the calculation is a multiplication of a point of an elliptic curve by a scalar. In an embodiment, the ranks of the bits of the third numbers are scanned by increasing order. In an embodiment, the bits of a same rank of the third numbers are processed in a same order, from one rank to the other. In an embodiment, the bits of a same rank of the third numbers are processed in a random order. In an embodiment, the processing order of the bits of a same rank of the third numbers results from a permutation. In an embodiment, processing performed on the bits of each rank comprises: if the considered bit is equal to 1, performing a first operation with an operator on the contents of a first register and of a second register, and then placing the result in the first register; and if the considered bit is equal to 0, keeping the contents of the two registers unchanged. In an embodiment, the first register contains the result of the calculation. In an embodiment, said operator is multiplication. In an embodiment, said operator is addition. In an embodiment, the first register is initialized with the neutral element of said operator. In an embodiment, the second register is initialized with the first number. In an embodiment, after having processed all the bits of same rank of the third numbers, a second operation is performed with said operator on the content of the second register, the result of the second operation being placed in the second register. In an embodiment, the operation(s) are performed modulo a fourth number.

In an embodiment, a non-transitory computer-readable medium's content configure a processing device to perform one or more of the methods described herein. In an embodiment, the contents comprise instructions which when executed configure the processing device to perform the method.

In an embodiment, a device comprises: one or more memories; cryptographic circuitry coupled to the one or more memories, wherein the cryptographic circuitry, in operation, performs a calculation on a first number and a second number, the performing the calculation including: breaking the second number into a plurality of third numbers, a sum of values of the third numbers being equal to a value of the second number; and performing the calculation bit by bit for each rank of the third numbers. In an embodiment, the calculation is a modular exponentiation of the first number by the second number. In an embodiment, the calculation is a multiplication of a point of an elliptic curve by a scalar. In an embodiment, the ranks of the bits of the third numbers are scanned by increasing order. In an embodiment, the bits of a same rank of the third numbers are processed in a same order, from one rank to the other. In an embodiment, the bits of a same rank of the third numbers are processed in a random order. In an embodiment, the processing order of the bits of a same rank of the third numbers results from a permutation. In an embodiment, the one or more memories comprises a first register and a second register and the processing performed on the bits of each rank comprises: if the considered bit is equal to 1, performing a first operation with an operator on the contents of a first register and of a second register, and then placing the result in the first register; and if the considered bit is equal to 0, keeping the contents of the two registers unchanged. In an embodiment, the first register contains the result of the calculation. In an embodiment, said operator is multiplication. In an embodiment, said operator is addition. In an embodiment, after having processed all the bits of same rank of the third numbers, the cryptographic circuitry, in operation, performs a second operation with said operator on the content of the second register, the result of the second operation being placed in the second register. In an embodiment, the cryptographic circuitry, in operation, performs the operation modulo a fourth number.

In an embodiment, a system comprises: cryptographic circuitry, which, in operation, performs a calculation on a first number and a second number, the performing the calculation including: breaking the second number into a plurality of third numbers, a sum of values of the third numbers being equal to a value of the second number; and performing the calculation bit by bit for each rank of the third numbers; and functional circuitry, coupled to the cryptographic circuitry, wherein the functional circuitry, in operation, uses a result of the calculation. In an embodiment, the calculation is a modular exponentiation of the first number by the second number. In an embodiment, the calculation is a multiplication of a point of an elliptic curve by a scalar.

The foregoing and other features and advantages of the present disclosure will be discussed in detail in the following non-limiting description of specific embodiments and implementation modes in connection with the accompanying drawings.

DETAILED DESCRIPTION

The same elements have been designated with the same reference numerals in the different drawings. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the applications of the executed calculations or of the circuits executing them have not been detailed, the described embodiments and implementations being compatible with usual applications.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., unless otherwise specified, it is referred to the orientation of the drawings.

The terms "about," "approximately," "substantially," and "in the order of" are used herein to designate a tolerance of plus or minus 10%, preferably of plus or minus 5%, of the value in question.

Figure 1:
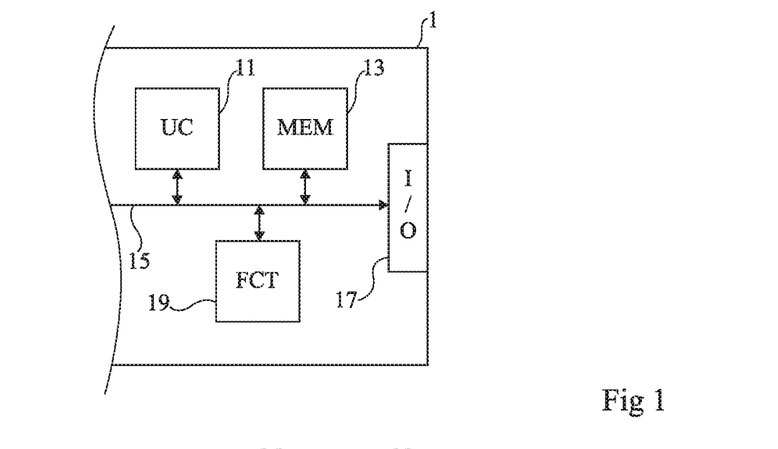
FIG. 1 schematically shows an embodiment of an electronic circuit.

FIG. 1 schematically shows an embodiment of an electronic circuit.

According to this embodiment, circuit 1 comprises:
- a calculation entity or cryptographic circuitry 11 (UC), for example, a state machine, a microprocessor, a programmable logic circuit, etc.;
- one or a plurality of volatile and/or non-volatile storage areas or memories 13 (MEM) for storing all or part of data and keys;
- one or a plurality of data, address, and/or control buses 15 between the different elements internal to circuit 1; and
- an input-output interface 17 (I/O) for communicating with the outside of circuit 1.

Circuit 1 may include various other circuits according to the application, symbolized in FIG. 1 by a block or functional circuitry 19 (FCT).

Iterative calculation operations, for example, modular exponentiation, can be found in many cipher algorithms, among which, for example, the system known as RSA.

A modular exponentiation comprises calculating a result C of an exponentiation of a number or message M by an exponent e (integer) modulo N, that is, applying a formula of the type:

$$C=M^e \pmod N \quad \text{[Math 1]}$$

Most often:
number M represents a number (or information representative of the number) which is desired to be ciphered, authenticated, signed, etc.; and
exponent e and modulo N (pair (e, N)) represent a cipher key, an authentication key, a signature key, etc. (or information representative of the key).

The calculation of the modular exponentiation by an electronic circuit (a state machine, a processor executing the method in the form of a program, a programmable logic circuit, etc.), for example, circuit 1, is generally performed by applying methods based on the use of a plurality of variables or registers and by performing iterative calculations on bits of the exponent. For example, in an embodiment the cryptographic circuitry 11 may perform a calculation, and the result of the calculation may be used, for example by functional circuitry 19 to perform a function (e.g., an authentication function).

Reference is made to a modular exponentiation arbitrarily noted $C=M^e \pmod N$, the transposition thereof to the variables used according to the operation implemented in practice being within the abilities of those skilled in the art.

Iterative calculation operations can also be found in operations such as scalar multiplications on elliptic curves, which form another category of cipher algorithms.

A scalar multiplication comprises calculating a result C of a multiplication of a point P of an elliptic curve by an integer d (scalar), that is, applying a formula of the type:

$$C=d.P \quad \text{[Math 2]}$$

Most often:
point P represents the number (or information representative of the number) which is desired to be ciphered, authenticated, signed, etc.; and
scalar d represents the cipher key, the authentication key, the signature key, etc. (or information representative of the key).

As for a modular exponentiation, the scalar multiplication on an elliptic curve by an electronic circuit (a state machine, a processor executing the method in the form of a program, a programmable logic circuit, etc.), for example, circuit 1, is generally performed by applying methods based on the use of a plurality of variables or registers and by performing iterative calculations on bits of the scalar.

Reference is made to a scalar multiplication on an elliptic curve arbitrarily noted C=d.P, the transposition thereof to the variables used according to the operation implanted in practice being within the abilities of those skilled in the art.

Various embodiments are described hereafter by taking as an example, in turns, an application to a modular exponentiation and an application to a calculation on an elliptic curve. In the examples described hereafter, the calculation uses at least two registers of circuit 1, or two memory locations, arbitrarily noted R0 and R1, on which the operations will be performed.

For simplification, the registers and their contents will be confounded, that is, when reference is made to operations performed on the registers, this means on the contents thereof.

Figure 2:
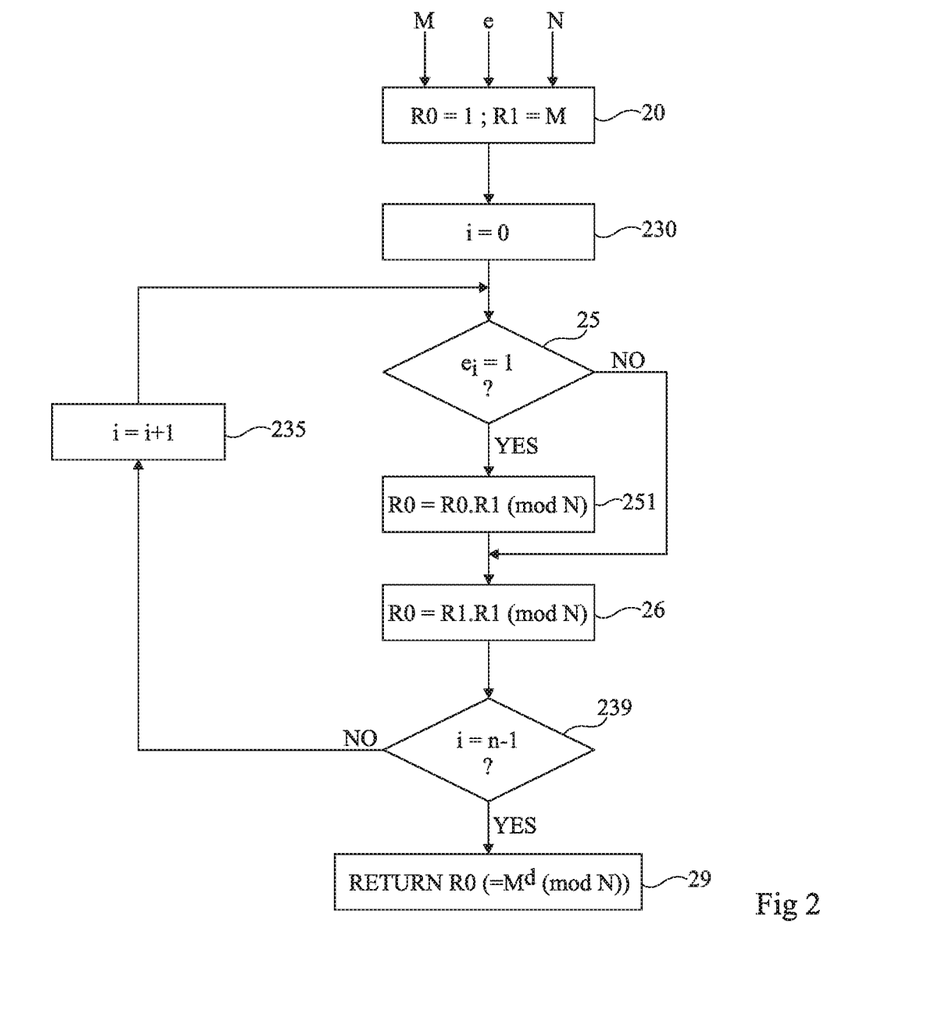
FIG. 2 shows, in the form of blocks, the steps of a usual modular exponentiation calculation.

FIG. 2 shows, in the form of blocks, steps of a usual modular exponentiation calculation At a first step (block 20, R0=1; R1=M), register R0 is initialized to 1 and register R1 is loaded with number M. Exponent e is loaded into another register (not shown) or resides in the memory. In the example shown in FIG. 2, it is considered that exponent e comprises n bits $e_i$.

A loop calculation on the bits $e_i$ of exponent e is then started. For example, a counter i is initialized to 0, representing the least significant bit (block 230, i=0) and is incremented by 1 (block 235, i=i+1) each time a bit $e_i$ of the exponent is processed, as long as not all the bits $e_i$ have been processed (block 239, i=n−1?).

At each iteration, that is, for each bit $e_i$ (successively from the least significant bit to the most significant bit), it is started by testing the value of the bit $e_i$ of exponent e (block 25, $e_i$=1?).

If the current bit $e_i$ is at 1 (output YES of block 25), the content of register R0 is multiplied, modulo N, by the content of register R1 and the result is placed in register R0 (block 251, R0=R0.R1 (mod N)).

Then, or if the current bit $e_i$ is equal to 0 (output NO of block 25), the content of register R1 is squared, modulo N, and the result is placed in register R1 (block 26, R1=R1.R1 (mod N)). In other words, the content of register R1 is multiplied by itself and the result is placed in register R1.

As long as not all the bits $e_i$ of exponent e have been processed (output NO of block 239), counter i is incremented (block 235, i=i+1) and it is returned to step 25 ($e_i$=1?). Once all the bits $e_i$ of exponent e have been processed (output YES of block 239), register R0 contains the result of the modular exponentiation (block 29, RETURN R0 (=$M^e$ (mod N)), that is, value C=$M^e$ (mod N).

The calculation illustrated in FIG. 2 may also be written as:
R0=1 (step 20)
R1=M (step 20)
For i=0 to n−1 (steps 230, 235, 239):
  If $e_i$=1 (step 25)
    then R0=R0.R1 (mod N) (step 251)
  R1=R1.R1 (mod N) (step 26)
End of loop (output YES of block 239)
Return R0 (step 29).

A circuit implementing the calculation illustrated in FIG. 2 may be vulnerable to horizontal attacks. In other words, a single trace of execution of this calculation by an electronic circuit, for example, circuit 1, may be exploited by an attacker or a hacker to trace back the secret information M manipulated by the circuit. Mathematical methods (for example, methods using Euler's indicator) indeed enable, starting from the execution trace, to extract the value of scalar d used to decipher, sign, etc., message M.

Once the value of exponent e is known, the hacker can decipher all the ciphered messages M, with a corresponding public key, or sign any message M and thus be authenticated as being another sender. The execution trace may take the form, for example, of a recording to the power variation consumed or of the electromagnetic radiation emitted, by the electronic circuit, on execution of the calculation.

Figure 3:
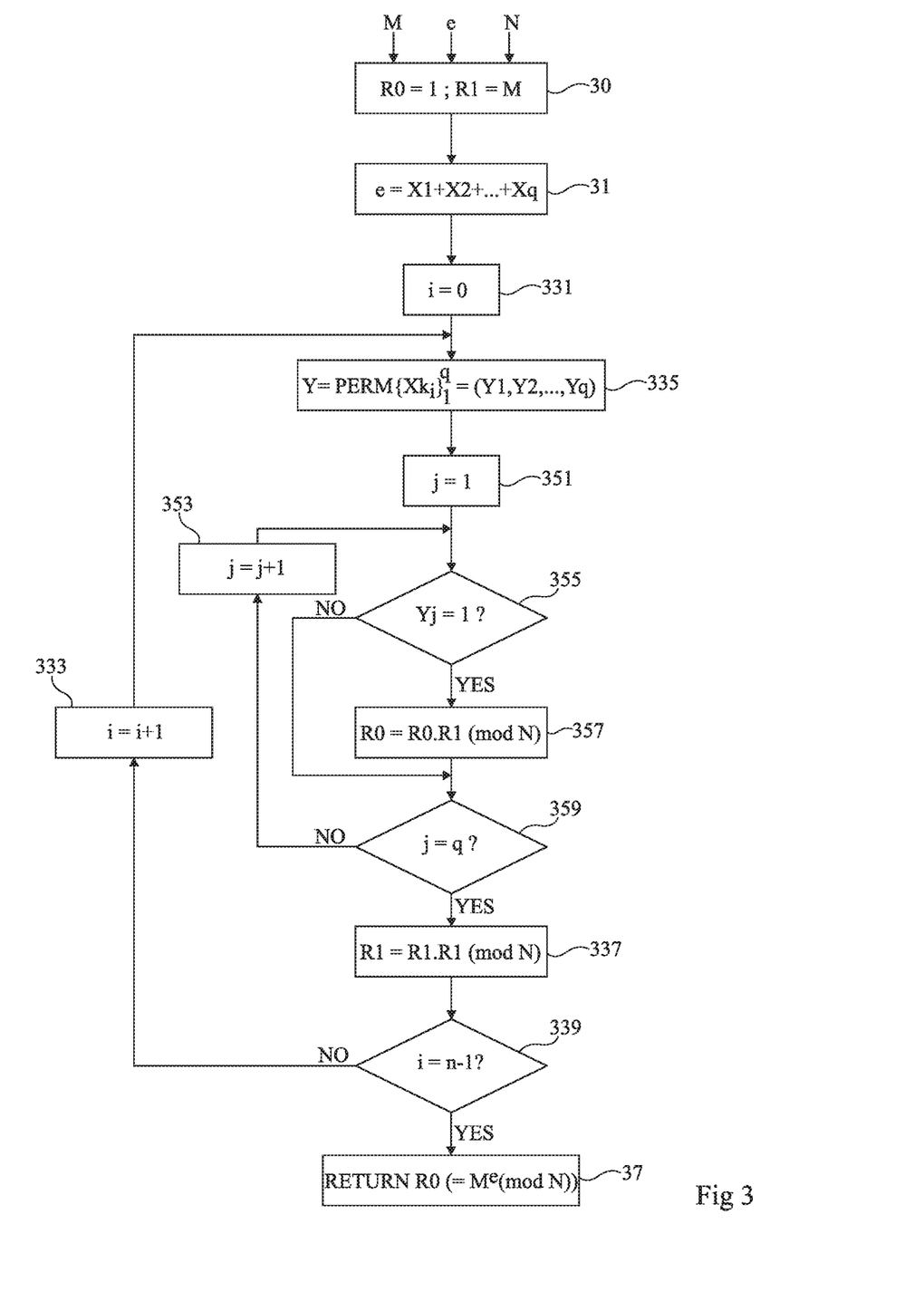
FIG. 3 shows, in the form of blocks, an embodiment of a method of protecting a modular exponentiation calculation.

FIG. 3 shows, in the form of blocks, an implementation mode of a method of protecting a modular exponentiation calculation.

At a first step (block 30, R0=1; R1=M), register R0 is set to 1 and register R1 is loaded with number M. Exponent e is loaded into another register (not shown) or resides in the memory. In the example shown in FIG. 3, exponent e comprises n bits $e_i$ (i designating the rank of bit $e_i$, with 0≤i≤n−1).

At a second step (block 31, e=X1+X2++Xq), exponent e is broken down into a sum of at least two integers X1, X2, which in an embodiment are non-zero. Numbers X1 to Xq thus correspond to terms of an algebraic sum of q integers (q≥2) having a result equal to exponent e. Exponent e can thus be written as:

$$e = X1 + X2 + \ldots + Xq = \sum_{k=1}^{q} Xk \quad \text{[Math 3]}$$

According to an embodiment of an implementation mode, each term Xk of the sum (that is, each number X1 to Xq) has a same number of bits, m.

As a variation, at least one term Xk of the sum has a number of bits smaller than number m of bits of the other terms Xk. Said term Xk of the sum then is, if present, completed on the most significant bit side with "0"s. This leads back to the embodiment of an implementation mode for which all terms Xk of the sum have the same number m of bits.

In the example of FIG. 3, it is considered that each integer Xk (1≤k≤q) among the q integers X1 to Xq is formed of m bits $Xk_i$ (0≤i≤m−1). In other words, bits $Xk_i$ respectively correspond to the bits $X1_i, X2_i, \ldots Xq_i$ of same rank i of the q integers X1 to Xq having their sum equal to exponent e.

A loop processing is then started on the bits $Xk_i$ of same rank. For example, a counter i is initialized to 0, representing the least significant bit (block 331, i=0) of integer Xk. Counter i is incremented by 1 (block 333, i=i+1) after each processing of all the bits $Xk_i$ of same rank i of numbers X1 to Xq.

According, for example, to a protection level to be achieved against horizontal attacks, all the bits $Xk_i$ of a same rank i are processed:

in a same order from one rank i to the other;
in a random order; or
in an order resulting from a permutation (for example, a circular permutation, a random permutation, etc.) of bits $Xk_i$.

According to the implementation mode illustrated in FIG. 3, the order in which the bits $Xk_i$ of same rank i of numbers X1 to Xq is determined according to a random permutation (block 335, Y=Math. 4 hereafter=(Y1,Y2, . . . , Yq)) of the q bits $Xk_i$ of same rank i.

$$PERM\{Xk_i\}_1^q \quad \text{[Math 4]}$$

Random permutation Math. 4 for example enables to thus form an ordered collection Y, or n-uplet, or sequence, or family of elements containing q elements Y1 to Yq. In other words, collection Y contains, for each rank i, elements Y1 to Yq which correspond to bits $X1_i, X2_i, \ldots Xq_i$ arranged in a random order.

For each iteration of counter i, a loop calculation on the q bits $Xk_i$ of same rank i, randomly arranged to form collection Y, is then started. For example, a counter j is initialized to 1, representing the first rank or element index (block 351, j=1) of ordered collection Y. Counter j is incremented by 1 (block 353, j=j+1) after each processing of an element Yj of collection Y.

At each iteration, that is, for each element Yj of rank j, it is started by testing the value of element Yj (block 355, Yj=1?). The value of each element Yj corresponds to the value of one of the bits $Xk_i$ of rank i of numbers X1 to Xq.

If element Yj has value 1 (output YES of block 355), the content of register R0 is multiplied, modulo N, by the content of register R1 and the result is placed in register R0 (block 357, R0=R0.R1 (mod N)).

If element Yj has value 0 (output NO of block 355), the content of registers R0, R1 remains unchanged.

It is then proceeded to the processing of the bit of the next element Yj (block 353, j=j+1).

As long as not all the q elements Yj of ordered collection Y have been processed (output NO of block 359 j=q?), counter j is incremented (block 353, j=j+1) and it is returned to step 355 (Yj=1?). This thus amounts to processing all the q bits $Xk_i$ of same rank i, for example in a random order. Once all the q elements Yj of collection Y have been processed (output YES of block 359), the content of register R1 is then squared, modulo N, and the result is placed in register R1 (block 337, R1=R1.R1 (mod N)). In other words, the content of register R1 is multiplied by itself and the result is placed in register R1.

As long as not all the bits $Xk_i$ of numbers X1 to Xq have been processed (output NO of block 339 i=n−1?), counter i is incremented (block 333, i=i+1) and it is returned to step 335 (Y=Math. 4=(Y1, Y2, . . . , Yq)). All the ranks i of bits $Xk_i$ of numbers X1 to Xq are then scanned by increasing order. Once all the bits $Xk_i$ of numbers X1 to Xq have been processed (output YES of block 339), register R0 contains the result of the modular exponentiation (block 37, RETURN R0 (=$M^e$ (mod N)), that is, value C=$M^e$ (mod N).

The calculation illustrated in FIG. 3 may also be written as:

R0=1 (step 30)
R1=M (step 30)
Select q integers X1 to Xq such that:
e=X1+X2+ . . . +Xq (step 31)
For i=0 to n−1 (steps 331, 333, 339)
  Y=Math. 4 (step 335)
  For j=1 to q (steps 351, 353, 359)
    If Yj=1 (step 355)
      then R0=R0.R1 (mod N) (step 357)
  End of loop (output YES of block 359)
  R1=R1.R1 (mod N) (step 337)
End of loop (output YES of block 339)
Return R0 (step 37)

This embodiment facilitates, by a breaking down of exponent e into a sum and, for example, by a processing in a random order of the bits $Xk_i$ of same rank i of terms X1, X2, . . . Xq of the sum, to resist side channel attacks. A circuit implementing the calculation illustrated in FIG. 3 is more resistant to horizontal attacks than a circuit implementing the calculation illustrated in FIG. 2. In other words, a single trace of execution of this calculation by an electronic circuit, for example, circuit 1, cannot be easily exploited by an attacker or a hacker to trace back the secret information M manipulated by the circuit.

Figure 4:
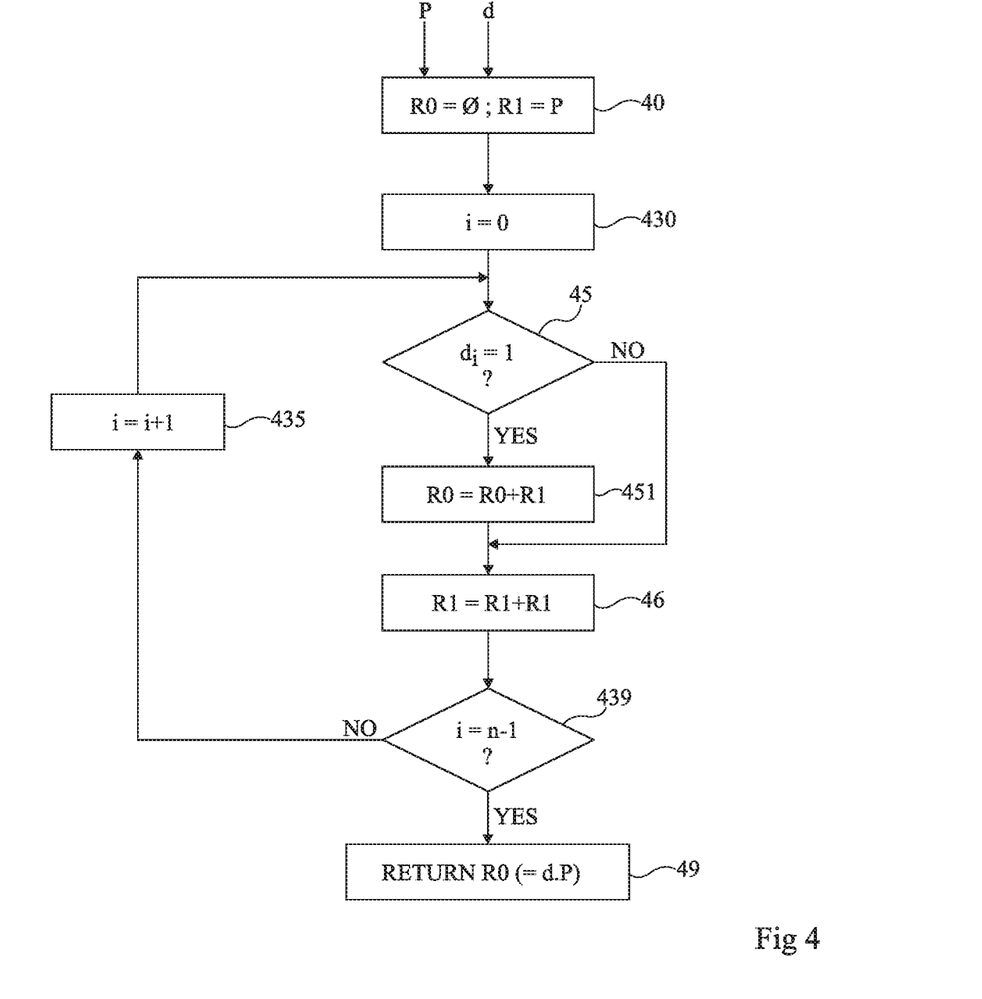
FIG. 4 shows, in the form of blocks, steps of a usual calculation on an elliptic curve.

FIG. 4 shows, in the form of blocks, steps of a usual calculation on an elliptic curve.

At a first step (block 40, R0=0; R1=P), register R0 is initialized to 0, which represents the neutral element of the elliptic curve. Point P is loaded into register R1. Scalar d is loaded into another register (not shown) or resides in the memory. In the example shown in FIG. 4, it is considered that scalar d comprises n bits $d_i$.

A loop calculation is then started on the bits $d_i$ of scalar d. For example, a counter i is initialized to 0, representing the least significant bit (block 430, i=0) and is incremented by 1 (block 435, i=i+1) at each processing of a bit $d_i$ of scalar d as long as not all the bits $d_i$ have been processed (block 439, i=n−1?).

At each iteration, that is, for each bit $d_i$ (successively from the least significant bit to the most significant bit), it is started by testing the value of bit $d_i$ of scalar d (block 45, $d_i=1$?).

If current bit $d_i$ has value 1 (output YES of block 45), the content of register R0 is added to the content of register R1 and the result is placed in register R0 (block 451, R0=R0+ R1)).

Then, or if the current bit $d_i$ has value 0 (output NO of block 45), the content of register R1 is doubled and the result is placed in register R1 (block 46, R1=R1+R1). In other words, the content of register R1 is added to itself and the result is placed in register R1.

As long as not all the bits $d_i$ of scalar d have been processed (output NO of block 439), counter i is incremented (block 435, i=i+1) and it is returned to step 45 ($d_i=1$?). Once all the bits $d_i$ of scalar d have been processed (output YES of block 439), register R0 contains the result of the multiplication on an elliptic curve (block 49, RETURN R0 (=d.P)), that is, value C=d.P.

The calculation illustrated in FIG. 4 may also be written as:

R0=Ø (step 40)
R1=P (step 40)
For i=0 to n−1 (steps 430, 435, 439):
  If $d_i=1$ (step 45)
    then R0=R0+R1 (step 451)
  R1 =R1 +R1 (step 46)
End of loop (output YES of block 439)
Return R0 (step 49).

A circuit implementing the calculation illustrated in FIG. 4 may be vulnerable to horizontal attacks. In other words, a single trace of execution of this calculation by an electronic circuit, for example, circuit 1, may be exploited by an attacker or a hacker to trace back the secret information P manipulated by the circuit. Mathematical methods indeed enable, starting from the execution trace, to extract the value of scalar d used to decipher, sign, etc., message P.

Once the value of scalar d is known, the hacker can decipher all the ciphered messages P, with a corresponding public key, or sign any message P and thus be identified as another sender. The execution trace may take the form, for example, of a recording to the power variation consumed or of the electromagnetic radiation emitted, by the electronic circuit, on execution of the calculation.

Figure 5:
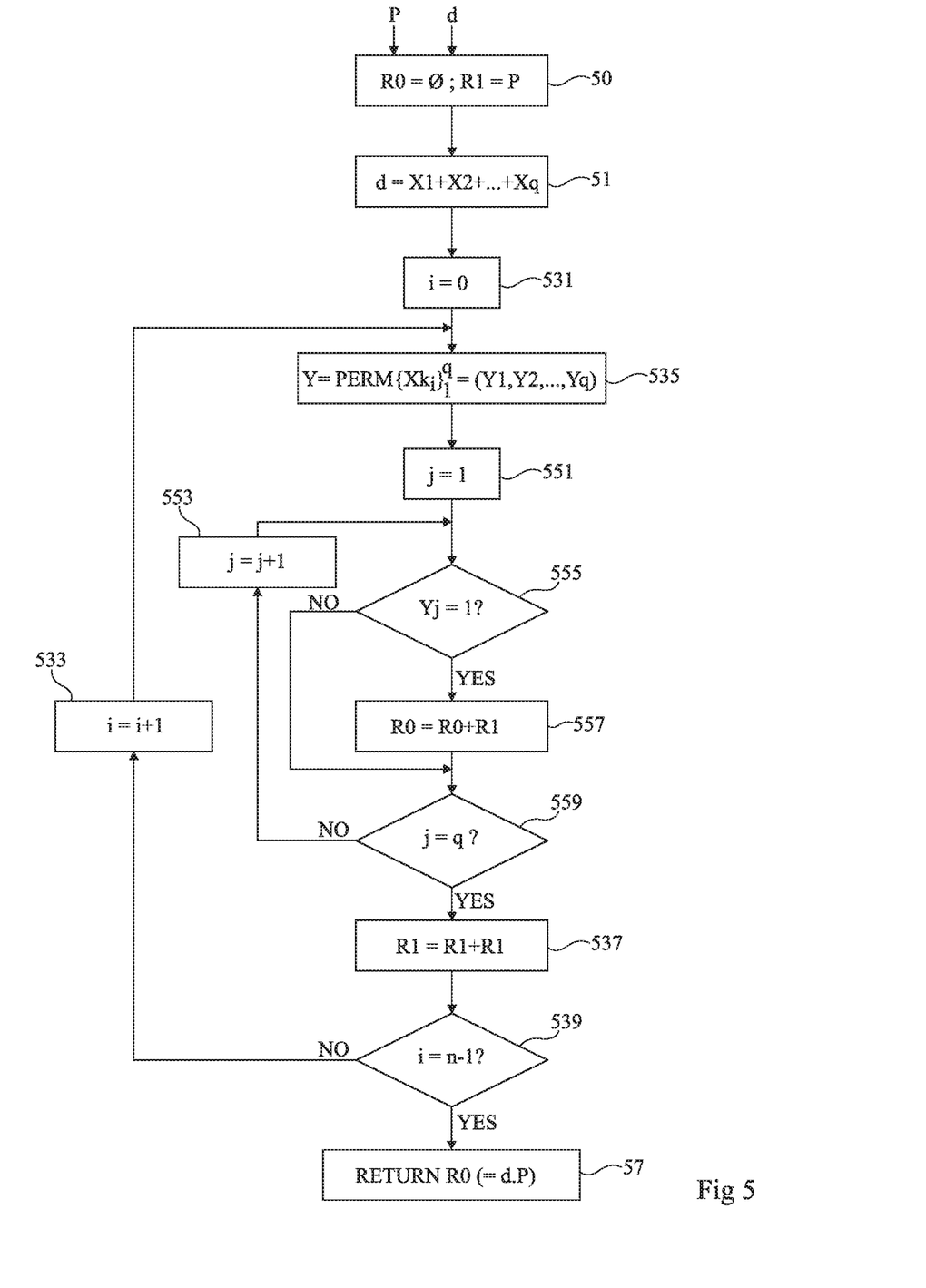
FIG. 5 shows, in the form of blocks, an embodiment of a method of protecting a calculation on an elliptic curve.

FIG. 5 shows, in the form of blocks, an embodiment of a method of protecting a calculation on an elliptic curve.

In a first step (block 50, R0=Ø; R1=P), register R0 is set to Ø, which represents the neutral element of the elliptic curve. Point P is loaded into register R1. Scalar d is loaded into another register (not shown) or resides in the memory. In the example shown in FIG. 5, scalar d comprises n bits $d_i$ (i designating the range of bit $d_i$, with 0≤i≤n−1).

At a second step (block 51, d=X1+X2+ . . . +Xq), scalar d is broken down into a sum of at least two integers X1, X2, which, in an embodiment, are non-zero. Numbers X1 to Xq thus corresponds to terms of an algebraic sum of q integers (q≥2) having a result equal to scalar d. Scalar d can thus be written as:

$$d = X1 + X2 + \ldots + Xq = \sum_{k=1}^{q} Xk \qquad \text{[Math 5]}$$

According to am embodiment of an implementation mode, each term Xk of the sum (that is, each number X1 to Xq) has a same number of bits, m.

As a variation, at least one term Xk of the sum has a number of bits smaller than number m of bits of the other terms Xk. Said term Xk of the sum then is, if present, completed on the most significant bit side with "0"s. This thus leads back to the embodiment of an implementation mode for which all terms Xk of the sum have the same number m of bits.

In the example of FIG. 5, it is considered that each integer Xk (1≤k≤q) among the q integers X1 to Xq is formed of m bits $Xk_i$ (0≤i≤m−1). In other words, bits $Xk_i$ respectively correspond to the bits $X1_i$, $X2i$, $Xq_i$ of same rank i of the q integers X1 to Xq having their sum equal to scalar d.

A loop processing is then started on the bits $Xk_i$ of same rank. For example, a counter i is initialized to 0, representing the least significant bit (block 531, i=0) of integer Xk. Counter i is incremented by 1 (block 533, i=i+1) after each processing of all the bits $Xk_i$ of same rank i of numbers X1 to Xq.

According, for example, to a protection level to be achieved against horizontal attacks, all the bits $Xk_i$ of a same rank i are processed:
  in a same order from one rank i to the other;
  in a random order; or
  in an order resulting from a permutation (for example, a circular permutation, a random permutation, etc.) of bits $Xk_i$.

According to the implementation mode illustrated in FIG. 5, the order in which the bits $Xk_i$ of same rank i of numbers X1 to Xq is determined according to a random permutation (block 535, Y =Math. 4 =(Y1, Y2, . . . , Yq)) of the q bits $Xk_i$ of same rank i. Random permutation Math. 4 for example enables to thus form an ordered collection Y, or n-uplet, or sequence, or family of elements containing q elements Y1 to Yq. In other words, collection Y contains, for each rank i, elements Y1 to Yq which correspond to bits $X1_i$, $X2_i$, . . . $Xq_i$ arranged in a random order.

For each iteration of counter i, a loop calculation on the q bits $Xk_i$ of same rank i, randomly arranged to form collection Y, is then started. For example, a counter j is initialized to 1, representing the first rank or element index (block 551, j=1) of ordered collection Y. Counter j is incremented by 1 (block 553, j=j+1) after each processing of an element Yj of collection Y.

At each iteration, that is, for each element Yj of rank j, it is started by testing the value of element Yj (block 555, Yj=1?). The value of each element Yj corresponds to the value of one of the bits $Xk_i$ of rank i of numbers X1 to Xq.

If element Yj has value 1 (output YES of block 555), the content of register R0 is added to the content of register R1 and the result is placed in register R0 (block 557, R0=R0+ R1)).

If element Yj has value 0 (output NO of block 555), the content of registers R0, R1 remains unchanged.

It is then proceeded to the processing of the bit of the next element Yj (block 553, j=j+1).

As long as not all the q elements Yj of ordered collection Y have been processed (output NO of block 559 j=q?), counter j is incremented (block 553, j=j+1) and it is returned to step 555 (Yj=1?). This thus amounts to processing all the q bits $Xk_i$ of same rank i, for example, in a random order.

Once all the q elements Yj of collection Y have been processed (output YES of block 559), the content of register R1 is then doubled, and the result is placed in register R1

(block 537, R1=R1+R1). In other words, the content of register R1 is added to itself and the result is placed in register R1.

As long as not all the bits $Xk_i$ of numbers X1 to Xq have been processed (output NO of block 539 i=n−1?), counter i is incremented (block 533, i=i+1) and it is returned to step 535 (Y=Math. 4=(Y1, Y2, . . . , Yq)). All the ranks i of bits $Xk_i$ of numbers X1 to Xq are then scanned by increasing order. Once all the bits $Xk_i$ of numbers X1 to Xq have been processed (output YES of block 539), register R0 contains the result of the multiplication on an elliptic curve (block 57, RETURN R0 (=d.P)), that is, value C=d.P.

The calculation illustrated in FIG. 5 may also be written as:

R0=∅ (step 50)
R1=P (step 50)
Select q integers X1 to Xq such that:
d=X1+X2+ . . . +Xq (step 51)
For i=0 to n−1 (steps 531, 533, 539)
   Y=Math. 4 (step 535)
   For j=1 to q (steps 551, 553, 559)
     If Yj=1 (step 555)
      then R0=R0+R1 (step 557)
   End of loop (output YES of block 559)
   R1=R1+R1 (step 537)
End of loop (output YES of block 539)
Return R0 (step 57)

This embodiment facilitates, by a breaking down of scalar d into a sum and, in an embodiment, by a processing in a random order of the bits $Xk_i$ of same rank i of terms X1, X2, . . . Xq of the sum, to resist side channel attacks. A circuit implementing the calculation illustrated in FIG. 5 is more resistant to horizontal attacks than a circuit implementing the calculation illustrated in FIG. 4. In other words, a single trace of execution of this calculation by an electronic circuit, for example, circuit 1, cannot be easily exploited by an attacker or a hacker to trace back the secret information P manipulated by the circuit.

Various embodiments, implementation modes, and variations have been described. It will be understood by those skilled in the art that certain features of these various embodiments, implementation modes, and variations may be combined, and other variations will occur to those skilled in the art. In particular, the selection of the size of exponent e or of scalar d, as well as the selection of the number q of terms Xk of the sum enabling to break down exponent e or scalar d, depend on the application and on the acceptable calculation time.

Finally, the practical implementation of the described embodiments, implementation modes, and variations is within the abilities of those skilled in the art based on the functional indications given hereabove. In particular, the forming of order collection Y is optional. A scanning, in a determined order, for example according to a random permutation, of the indexes k enabling to directly point to one of the q bits $Xk_i$ of same rank i of numbers X1 to Xq, may indeed be imagined.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing, using an electronic circuit, a calculation on a first number and a second number; and
protecting the executing of the calculating, the protecting including:
breaking the second number into a plurality of third numbers, a sum of values of the third numbers being equal to a value of the second number; and
performing the calculation bit by bit for each rank of the third numbers.

2. The method of claim 1, wherein the calculation is a modular exponentiation of the first number by the second number.

3. The method of claim 1, wherein the calculation is a multiplication of a point of an elliptic curve by a scalar.

4. The method of claim 1, wherein the ranks of the bits of the third numbers are scanned by increasing order.

5. The method of claim 1, wherein the bits of a same rank of the third numbers are processed in a same order, from one rank to the other.

6. The method of claim 1, wherein the bits of a same rank of the third numbers are processed in a random order.

7. The method of claim 1, wherein the processing order of the bits of a same rank of the third numbers results from a permutation.

8. The method of claim 1, wherein processing performed on the bits of each rank comprises:
if the considered bit is equal to 1, performing a first operation with an operator on the contents of a first register and of a second register, and then placing the result in the first register; and if the considered bit is equal to 0, keeping the contents of the two registers unchanged.

9. The method of claim 8, wherein the first register contains the result of the calculation.

10. The method of claim 8, wherein said operator is multiplication.

11. The method of claim 8, wherein said operator is addition.

12. The method of claim 8, wherein the first register is initialized with the neutral element of said operator.

13. The method of claim 8, wherein the second register is initialized with the first number.

14. The method of claim 8, wherein, after having processed all the bits of same rank of the third numbers, a second operation is performed with said operator on the content of the second register, the result of the second operation being placed in the second register.

15. The method of claim 8, wherein the operation(s) are performed modulo a fourth number.

16. A device, comprising:
one or more memories;
cryptographic circuitry coupled to the one or more memories, wherein the cryptographic circuitry, in operation, performs a calculation on a first number and a second number, the performing the calculation including:
breaking the second number into a plurality of third numbers, a sum of values of the third numbers being equal to a value of the second number; and
performing the calculation bit by bit for each rank of the third numbers.

17. The device of claim 16, wherein the calculation is a modular exponentiation of the first number by the second number.

18. The device of claim 16, wherein the calculation is a multiplication of a point of an elliptic curve by a scalar.

19. The device of claim 16, wherein the ranks of the bits of the third numbers are scanned by increasing order.

20. The device of claim 16, wherein the bits of a same rank of the third numbers are processed in a same order, from one rank to the other.

21. The device of claim 16, wherein the bits of a same rank of the third numbers are processed in a random order.

22. The device of claim 16, wherein the processing order of the bits of a same rank of the third numbers results from a permutation.

23. The device of claim 16, wherein the one or more memories comprises a first register and a second register and the processing performed on the bits of each rank comprises:
if the considered bit is equal to 1, performing a first operation with an operator on the contents of a first register and of a second register, and then placing the result in the first register; and
if the considered bit is equal to 0, keeping the contents of the two registers unchanged.

24. The device of claim 23 wherein the first register contains the result of the calculation.

25. The device of claim 23, wherein said operator is multiplication.

26. The device of claim 23, wherein said operator is addition.

27. The device of claim 23, wherein, after having processed all the bits of same rank of the third numbers, the cryptographic circuitry, in operation, performs a second operation with said operator on the content of the second register, the result of the second operation being placed in the second register.

28. The device of claim 23 wherein the cryptographic circuitry, in operation, performs the operation modulo a fourth number.

29. A system, comprising:
cryptographic circuitry, which, in operation, performs a calculation on a first number and a second number, the performing the calculation including:
breaking the second number into a plurality of third numbers, a sum of values of the third numbers being equal to a value of the second number; and
performing the calculation bit by bit for each rank of the third numbers; and
functional circuitry, coupled to the cryptographic circuitry, wherein the functional circuitry, in operation, uses a result of the calculation.

30. The system of claim 29, wherein the calculation is a modular exponentiation of the first number by the second number.

31. The system of claim 29, wherein the calculation is a multiplication of a point of an elliptic curve by a scalar.

* * * * *